Patented Oct. 7, 1930

1,777,600

UNITED STATES PATENT OFFICE

ELMER K. BOLTON, OF WILMINGTON, DELAWARE, AND FREDERICK B. DOWNING, OF CARNEYS POINT, NEW JERSEY, ASSIGNORS TO E. I. DU PONT DE NEMOURS & COMPANY, OF WILMINGTON, DELAWARE, A CORPORATION OF DELAWARE

PROCESS OF PREPARING BUTADIENE

No Drawing.    Application filed January 8, 1927. Serial No. 159,993.

This invention relates to the production of butadiene, $CH_2=CH-CH=CH_2$, from diacetylene, $CH\equiv C-C\equiv CH$, and, more particularly, by the catalytic hydrogenation of the diacetylene.

Various methods have been suggested for the preparation of butadiene, but many of them have been found objectionable for various reasons and are of small value since they are not adapted for commercial utilization. Furthermore, the methods of the prior art generally require the use of high temperatures, which make the processes not only uneconomical but inefficient, due, in a large measure, to the undesirable products of decomposition which are formed in substantial quantities when high temperatures are used.

It is one of the objects of this invention to prepare butadiene by means of a comparatively simple, economical and efficient procedure suitable for commercial application. It is another object to carry out the process at comparatively moderate temperatures in order to avoid excessive overheating with its subsequent undesirable decomposition of the products of the reaction. Other objects will be apparent from the description.

The present invention relates to the catalytic preparation of butadiene and involves the discovery that, when a mixture of diacetylene and hydrogen is passed over a suitable catalyst which is preferably maintained at ordinary or slightly elevated temperatures, the hydrogen is caused to combine with the diacetylene in such proportions as to yield butadiene.

More specifically, butadiene is prepared by the procedure described in detail below. A catalyst is prepared by igniting purified nickel nitrate, gently at first, and finally to a temperature of 350–400° C. until all nitrogen oxides are driven off. Heating the material to redness is to be avoided as well as any unnecessary ignition after the oxides of nitrogen have been removed, since the rate of subsquent reduction of the nickel is retarded and the activity of the catalyst is impaired by excessive heating. The ignited nickel oxide is reduced in a stream of purified hydrogen at a temperature of approximately 300° C. The finely divided nickel thus produced is cooled, preferably in a stream of hydrogen or other non-oxidizing gas, and is then ready for use. A suitable quantity of the nickel catalyst is placed in any suitable contact apparatus, and, while maintaining the catalyst at a temperature between 40° and 80° C., the reaction gas mixture is contacted therewith. Such gas mixture contains hydrogen and diacetylene in about the proportions of 2:1, and its passage through the contact apparatus is governed by an analysis of the emergent gases, care being taken to control the rate of flow to obtain the best conversion. The hydrogen and diacetylene combine to form the butadiene which may be recovered from the effluent gases by any desired method.

Since butadiene condenses to a liquid at about 0° C., it may be separated by chilling the effluent gases to a temperature of or below 0° C. If any of the other constituents of the gases are condensed with the butadiene, the latter may be separated from them in any suitable manner. Or, if desired, the butadiene resulting from the reaction may be recovered by treating the gaseous or liquefied reaction products with an aqueous or acid solution of sulfur dioxide. The crystalline compound thus formed may then be isolated or decomposed with the production of butadiene of high purity.

It is evident that many variations may be introduced in the process without materially affecting the results. The number of hydrogenating catalysts which are suitable for use in the process is large, and includes such active metal catalysts as nickel, platinum, palladium, copper, or mixtures thereof. The catalytic contact masses may be prepared in any suitable way, and may be used alone, or supported on, or mixed with inert materials. Suitable promoters may be added to the catalyst masses for enhancing the catalytic properties of such masses. The catalyst is preferably in finely divided form.

The catalytic hydrogenation may be carried out at various pressures and temperatures. It has been found that excellent results are obtained by maintaining the pressure of the reaction system at, or slightly above atmospheric pressure. The reactions proceed at ordinary or slightly elevated temperatures, the catalyst usually functioning best at temperatures between 40 and 80° C. depending upon the nature of the catalyst. However, the butadiene-forming reaction takes place at temperatures from about 0° C. to 400° C., although the lower temperatures decrease the reaction rate, and the higher temperatures cause the formation of undesirable reaction- and decomposition-products with corresponding decreases in the yield of butadiene.

The gas mixtures containing diacetylene and hydrogen may be varied largely as to proportions, but it has been found that good results are obtained when the diacetylene and hydrogen are present in the proportion of about 1:2, corresponding to the equation $C_4H_2 + 2H_2 = C_4H_6$. It is usually preferable to use somewhat less hydrogen than the theoretical, in preference to using an excess of hydrogen. It is sometimes desirable to use hydrogen and diacetylene in proportions of less than 2:1 to avoid partial overreduction and loss of valuable hydrocarbons, and to finish the reduction in some other manner. The gas mixtures may also contain saturated hydrocarbons, nitrogen, or other inert gases. The mixtures may be dried and purified prior to the reaction, suitable precautions being taken, when necessary, to avoid catalyst poisons and other deleterious substances in the gas mixtures.

The butadiene prepared according to the present process is capable of utilization in any of the well-known ways, and is particularly valuable for use in the manufacture of synthetic rubbers. The present process is well adapted for commercial application, and is highly valuable for this reason.

Any suitable apparatus may be used in carrying out the present process, the details of such apparatus being readily apparent to those skilled in the art.

Suitable changes may be made in the details of the process without departing from the spirit or scope of the present invention.

We claim:

1. The process of preparing butadiene which comprises passing a gas containing diacetylene and hydrogen over a nickel catalyst at a temperature between 40–80° C.

2. The process of preparing butadiene which comprises passing a gas containing diacetylene and hydrogen in proportions not in excess of 1:2 over a nickel catalyst at a temperature between 0°–400° C.

3. The process of producing butadiene which comprises passing a gas containing diacetylene and hydrogen in substantially the proportions of 1:2 over a catalyst adapted to promote the hydrogenation of the diacetylene.

4. The process of producing butadiene which comprises passing a gas containing diacetylene and hydrogen in substantially the proportions of 1:2 over a finely divided nickel catalyst at a temperature between 40–80° C.

5. The process of producing butadiene which comprises passing a gas containing diacetylene and hydrogen in proportions not substantially in excess of 1:2 over a hydrogenating metal catalyst at a temperature between 40 to 80° C.

6. The process of producing butadiene which comprises passing a gas containing diacetylene and hydrogen in proportions not substantially in excess of 1:2 over a finely divided nickel catalyst at a temperature between 40–80° C.

In testimony whereof we affix our signatures.

ELMER K. BOLTON.
FREDERICK B. DOWNING.